United States Patent [19]

Visek

[11] Patent Number: 4,546,738

[45] Date of Patent: Oct. 15, 1985

[54] RECIPROCATING INTERNAL COMBUSTION ENGINE

[75] Inventor: Tomas Visek, Steyr, Austria

[73] Assignee: Steyr-Daimler-Puch Aktiengesellschaft, Vienna, Austria

[21] Appl. No.: 580,466

[22] Filed: Feb. 15, 1984

[30] Foreign Application Priority Data

Feb. 25, 1983 [AT] Austria .................................. 663/83

[51] Int. Cl.[4] ............................................... F16M 1/02

[52] U.S. Cl. ............................ 123/195 C; 123/198 E; 248/666

[58] Field of Search ........... 123/195 R, 195 A, 195 C, 123/195 S, 195 H, 198 E; 180/311, 312; 248/666

[56] References Cited

U.S. PATENT DOCUMENTS 3,064,634 11/1962 Tyce et al. ........................ 123/195 S
3,880,134 4/1975 Thien et al. ...................... 123/198 E
4,213,439 7/1980 Feichtinger et al. ........... 123/198 E
4,287,861 9/1981 Lettner et al. .................. 123/195 C
4,399,777 8/1983 Hoettels .......................... 123/195 R

FOREIGN PATENT DOCUMENTS 2801431 1/1980 Fed. Rep. of Germany .

*Primary Examiner*—Craig R. Feinberg
*Assistant Examiner*—David A. Okonsky
*Attorney, Agent, or Firm*—Karl F. Ross; Herbert Dubno

[57] ABSTRACT

A reciprocating internal combustion engine comprises an engine block, which includes cylinders, cylinder heads, pistons, connecting rods, a crankshaft and the mainshaft bearings for the crankshaft. That engine block is held in an outer pan by means of annular supporting elements, which are provided at both ends of the engine block and are coaxial to the crankshaft and insulate against a transmission of structure-borne noise. The engine block is sealed to the upper edge portion of the outer pan only by an oil seal. The outer pan consists of two parts, which are connected by screws. To prolong the service life of the annular supporting elements and to reduce the manufacturing costs, the outer pan has a parting plane which contains the axis of the crankshaft. The supporting elements are secured in the outer pan merely by being clamped between the two parts of the pan.

2 Claims, 3 Drawing Figures

RECIPROCATING INTERNAL COMBUSTION ENGINE

FIELD OF THE INVENTION

My present invention relates to a reciprocating internal combustion engine and, more particularly, to a mainshaft seal assembly therefor.

BACKGROUND OF THE INVENTION

A reciprocating internal combustion engine generally comprises an engine block, which includes cylinders, cylinder heads, pistons, connecting rods, a crankshaft and the mainshaft bearings for the crankshaft, and which is inserted in an oiltight manner and with the aid of annular supporting elements insulating against a transmission of structure-borne sound in an outer pan, which consists of two parts connected by screws, wherein the engine block is held at its two ends in the outer pan by means of the supporting elements, which are coaxial to the crankshaft and insulate against a transmission of structure-borne sound, and is sealed to the top edge portion of the outer pan only by an oil seal.

Such internal combustion engine is already known from Laid-open German Application No. 28 01 431. In that known engine the annular supporting elements which insulate against a transmission of structure-borne sound are screw-connected to the engine block and constitute an outer flange, which is screw-connected to the outer pan. In that known engine the large number of fastening screws, which are parallel to the axis of the crankshaft, adds to construction cost, and it has been found that the structural elements which insulate against a transmission of structure-borne noise and which consist, as a rule, of rubber or rubberlike material, are stressed in the direction of the axis of the crankshaft. That stress, which adversely affects the life of said supporting elements, is due to the fact that the axial dimensions of the engine block and of the outer pan do not exactly agree because certain deviations are inevitable in spite of subsequent machining operations. If the supporting elements consist of a rubber-metal connector comprising an inner ring secured to the engine block and an outer ring secured in the outer pan so that the supporting elements will take up also the engine torque, an adhesive joint between the rubber cores of the supporting elements and their outer and inner rings must be provided under the action of heat and the subsequent cooling often results in internal stresses in the supporting elements due to shrinkage. Such stresses have been opposed in that the outer rings were compacted by roll-forming. But such compacting by roll-forming has been hindered by the flanges previously provided on the outer rings. For this reason the flanges are only subsequently formed by a machining operation, which adds to the manufacturing costs. Furthermore the outer pan is assembled from two parts, the parting plane is transverse to the crankshaft and the division serves only to facilitate the installation of the crankshaft.

OBJECT OF THE INVENTION

It is an object of the invention to eliminate these disadvantages and so to improve the reciprocating internal combustion engine described first hereinbefore that the manufacturing costs are reduced and the durability of the annular supporting elements is increased.

SUMMARY OF THE INVENTION

This object is achieved in accordance with the invention by providing the outer pan with a parting plane which contains the axis of the crankshaft and the supporting elements and with optional outer rings adhesively joined to said supporting elements, held in the outer pan merely by being clamped between the two parts of the pan.

Because the annular supporting elements are held merely in that they are clamped between the two-screw-connected parts of the pan, the flanges and the screws previously used to secure the flanges can be omitted so that the manufacturing cost is reduced. Even substantial manufacturing tolerances in the direction of the axis of the crankshaft cannot give rise to stresses in the supporting elements because the latter are not secured to the outer pan by means of a flange. Any manufacturing tolerances are now taken up without inducing stresses so that the life of the supporting elements is correspondingly prolonged. Each supporting element may be adhesively joined to an inner ring and an outer ring. The outer ring may be omitted, if desired. If an outer ring is provided and has been heat-treated to effect a vulcanization or curing, such outer ring can readily be compacted by roll-forming because a flange for the outer ring is not required.

BRIEF DESCRIPTION OF THE DRAWING

Illustrative embodiments of the invention are shown by way of example on the drawing on different scales. In the drawing

SPECIFIC DESCRIPTION

Figure 1:
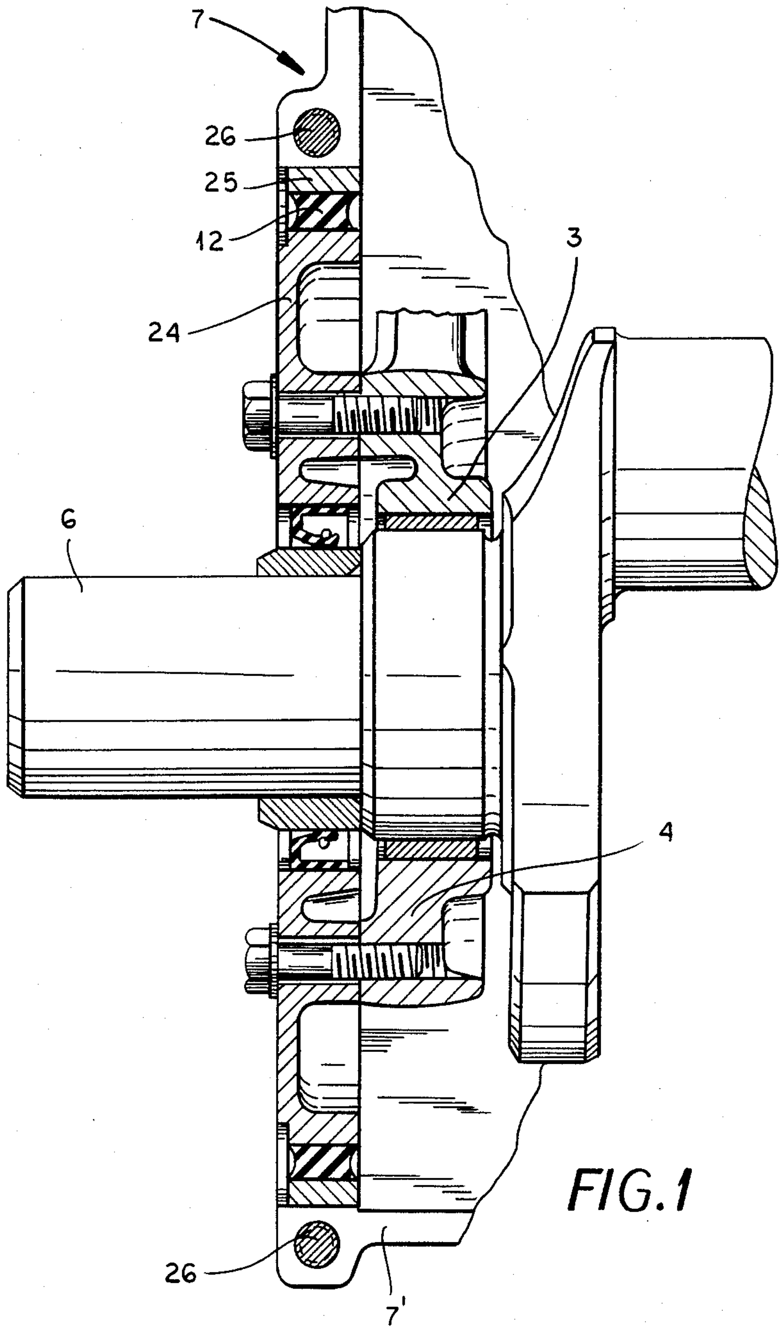
FIG. 1 is a fragmentary axial sectional view showing a portion of a reciprocating internal combustion engine.
Figure 2:
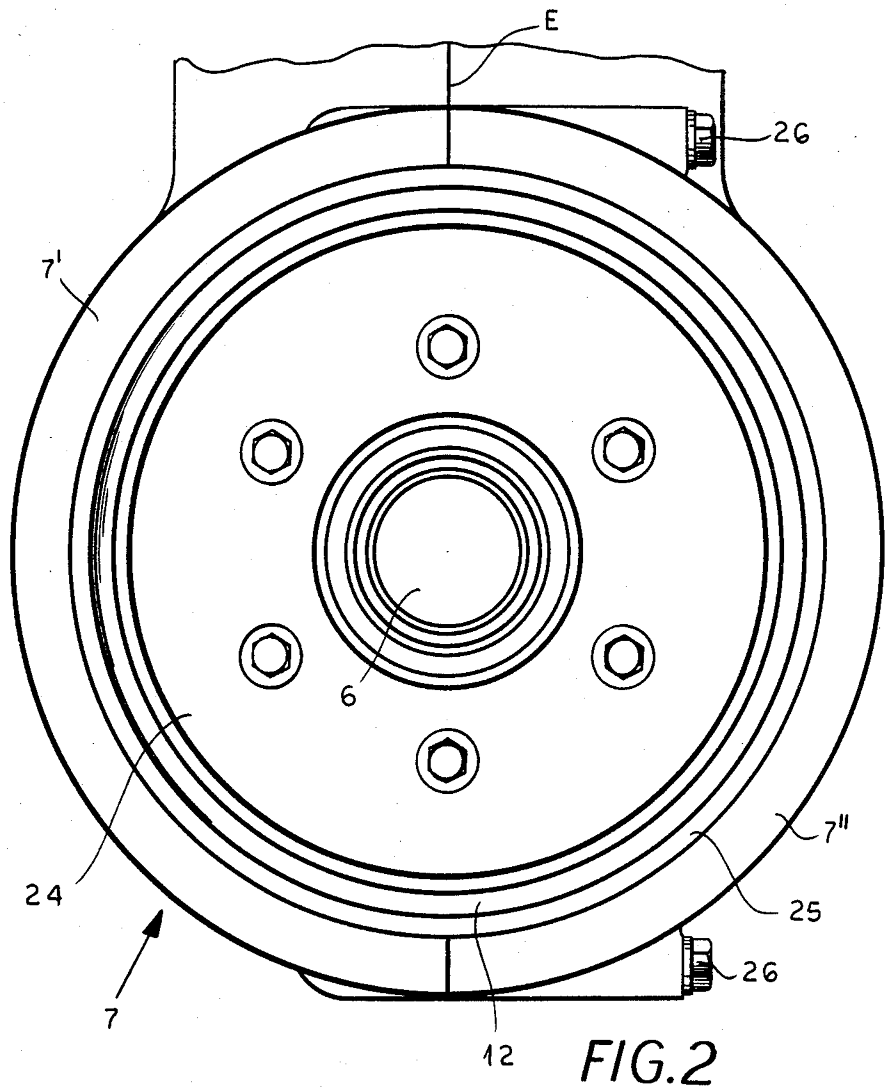
FIG. 2 is a corresponding end view and FIG. 3 is a sectional view which is similar to FIG. 1 and illustrates a detail of a modification.

The crankshaft 6 of a reciprocating internal combustion engine, the connecting rods and pistons, not shown, the main bearings 3, 4 for the crankshaft, the cylinders and cylinder heads, which are also not shown, constitute an engine assembly or unit, which is mounted in an outer pan 7 by means of supporting elements 12, which insulate against a transmission of structure-borne sound. An oil seal, not shown, is provided between the upper edge portion of the outer pan 7 and the engine block. The supporting elements 12 which insulate against a transmission of structure-borne sound consist of rubber or another suitable elastomer and consist of rings, which are coaxial with the crankshaft 6. In accordance with FIG. 1 each of said supporting elements 12 is disposed between an inner ring 24 and an outer ring 25. The inner and outer rings 24, 25 are adhesively joined or bonded to the supporting element 12 by vulcanization or curing. The inner ring 24 is screw-connected to the engine block, particularly to the outer main bearing 3, 4 for the crankshaft.

In accordance with the invention the outer pan 7 consists of two parts 7′, 7″, which are held together by parallel screws 26 lying in a first plane perpendicular to the axis of the crankshaft and transverse of the latter. The two parts are separated by a parting plane 8, which contains the axis of the crankshaft and which is perpendicular to the second plane of screws 26. Each outer ring 25 is held merely by being clamped between said two pan parts 7′, 7″. This is accomplished in that the screws 26 which hold the parts 7′, 7″ of the outer pan together and urge them toward the parting plane E cause said parts 7′, 7″ to apply to the annular supporting elements 12 a pressure toward the parting plane E.

Figure 3:
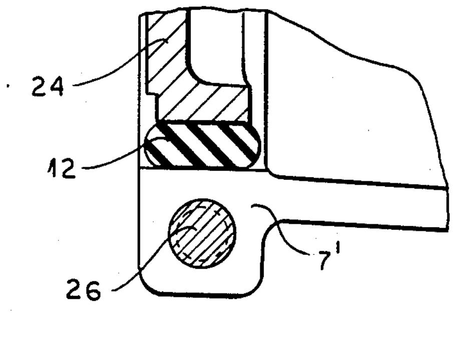

In the embodiment shown in FIG. 3, the annular supporting elements 12 which insulate against a transmission of structure-borne sound are provided with an inner ring 24 but are not provided with an outer ring and are directly clamped in cylindrical recesses formed in the two pan parts 7′, 7″.

What is claimed is:

1. In an internal combustion engine, the combination which comprises:

a drive assembly constituted by a main bearing, and a crankshaft journaled in said main bearing and rotatable about a crankshaft axis and provided with pistons and connecting rods for displacing the crankshaft;

an outer pan sealed with respect to said assembly and provided with a pair of pan parts having a dividing plane extending along said axis and defining an opening;

a sound-transmission insulating element lying in a second plane perpendicular to said axis and to said dividing plane disposed within said opening in said outer pan, said element comprising:

a rigid ring attached to said bearing by bolts which traverses said ring perpendicular to said second plane, and a resilient ring bonded to said rigid ring and peripherally retained by said outer pan solely by clamping between said parts; and bolts on opposite sides of said crankshaft extending perpendicular to said dividing plane and substantially in said second plane for drawing said parts together to provide the clamping force retaining the outer periphery of said resilient ring in said outer pan.

2. The combination defined in claim 1, further comprising an outer supporting ring bonded to said resilient ring, lying in said second plane and forming part of said element clamped between said parts.

* * * * *